Oct. 14, 1941.  S. ROSENZWEIG  2,259,214
VIBRATION ISOLATION BASE FOR MOTORIZED FANS AND THE LIKE
Filed Jan. 29, 1940
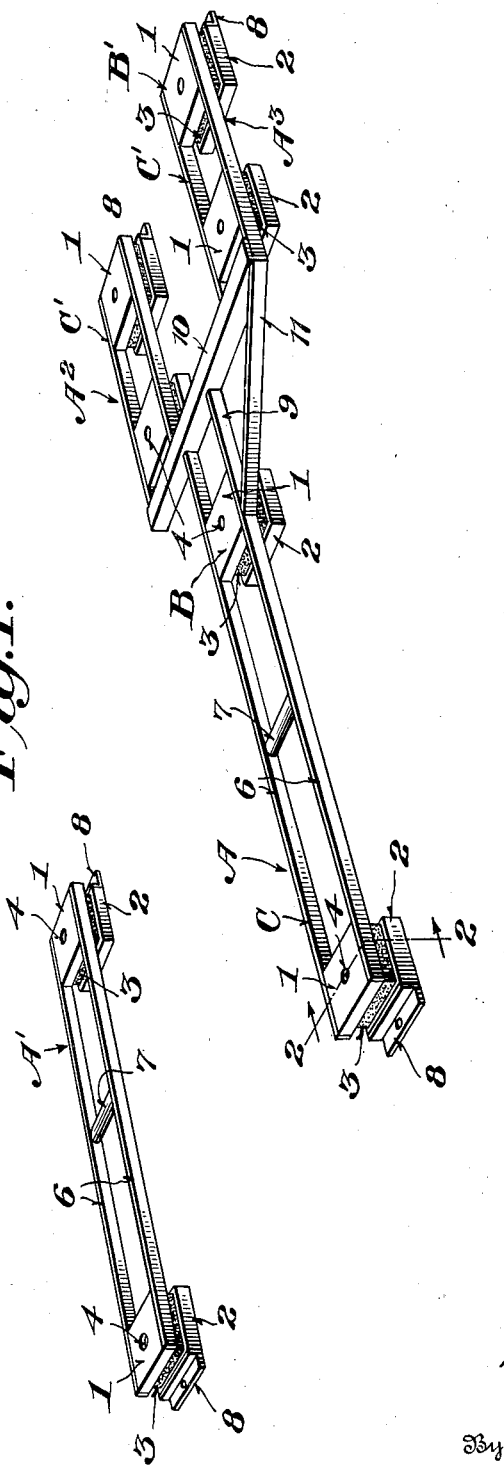
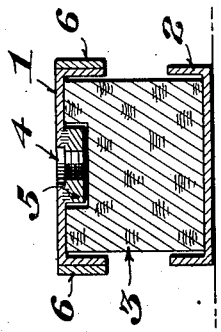
Inventor
S. Rosenzweig, Patented Oct. 14, 1941

2,259,214

UNITED STATES PATENT OFFICE 2,259,214

VIBRATION ISOLATION BASE FOR MOTORIZED FANS AND THE LIKE

Siegfried Rosenzweig, Long Island City, N. Y.

Application January 29, 1940, Serial No. 316,271

2 Claims. (Cl. 248—22)

This invention relates to vibration isolation structures and more particularly to a light weight fabricated machine supporting base which is economical to manufacture and easy to install.

Vibration isolation installations must be constructed to suit the needs of each individual machine or apparatus and for that reason it is impossible to provide standardized completed structures which may be carried in stock and sold and installed after the fashion of many products which are built to predetermined specifications. Therefore, in order to meet situations of this kind, it is necessary to be able readily to utilize various parts which may be quickly and properly fabricated in accordance with the demands or specifications of the particular installation.

Accordingly, a primary object of the invention is to provide a construction which lends itself to ready fabrication, and which when completed is considerably lighter and yet stronger and more stable than constructions heretofore used for the purpose, thereby greatly facilitating handling, and at the same time assuring the organization of the various parts in their proper relation not only properly to support and carry the load of an operating machine, but also to absorb the vibrations thereof and prevent their transmission to the building in which the machine is installed. In that connection, the invention also proposes to mount the driven machine and the driver on the same base in order to prevent any difference in deflection and therefore alignment between the two machines. The shifting of one machine relative to the other may cause misalignment which is likely to cause serious disturbance in the behavior of the motor. The present invention avoids this difficulty.

A specific object of the invention is to provide a novel primary frame unit including strips or bars and parts constituting a damper housing which may be secured together by welding so as to provide an open framework properly and adequately bracing and connecting the dampers at the locations necessary to efficiently absorb vibration.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawing, in which:

Figure 1 is a perspective view illustrating a preferred embodiment of the invention.

Figure 2 is a vertical sectional view taken on the line 2—2 of Figure 1.

Similar reference characters designate corresponding parts throughout the several figures of the drawing.

According to the embodiment of the invention shown in the drawing the same fundamentlly includes in its organization a plurality of primary frame units A, $A^1$, $A^2$ and $A^3$. The primary frame units A and $A^1$ provide a main machine supporting base while the units $A^2$ and $A^3$ provide a secondary supporting base.

Each of the primary units includes damper housings B connected by a framework designated generally as C.

The said damper units B preferably comprise upper and lower cup members 1 and 2. Although the drawing illustrates these cup members as being of rectangular form, nevertheless the same may be round or of other shape so long as they retain the essential characteristics of a wall having an upstanding edge flange or flanges whereby when the flanged sides of both members extend toward each other, they afford a partial housing for vibration damping means 3, preferably a block of cork or the like. The cup members 1 and 2 constitute parts which may be made up and carried in stock so that when an isolation base is to be made, this part will be ready for incorporation into the general base structure. In that connection, it is proposed to provide the members which constitute the upper cups 1 with an opening 4 which may be punched therein by any well known metal punching machine, and, at the underside of the opening, a tapped or threaded nut 5 is welded so that the upper cup member 1 may receive a bolt which assists in anchoring the machine to the base.

The cup-like members 1 and 2 which constitute the damper housings are secured in proper assembled or spaced relation by the frames C which consist of metal straps 6 welded to opposite sides thereof. These straps 6 may be bar or strip stock which may be stocked in mill lengths and then sheared into shorter lengths to meet the specifications of the individual isolation base. When the straps 6 are welded to opposite sides of the cup members 1, if it becomes necessary to brace said members between the damper housings due to the length of the span a suitable cross brace 7 may be arranged intermediate the housings by welding the ends of said member to the inside faces of the straps 6. It will, of course, be understood that where the sides of the frame C consist of only relatively short strips 6, as for example, in the case of the units A² and A³, the intermediate cross brace 7 is unnecessary.

The primary frame units A–A³, inclusive, may be arranged in various relationships in order to support the particular piece of machinery. For example, a pair of primary frame units A and A' may be arranged in spaced parallel relation to support the motor of a motorized fan assembly. In other words, a pair of the primary frame units A and A' may be arranged in spaced parallel relation beneath the motor to provide a main supporting base and to guard against shifting or movement of these elements after they are once in place, one side of the bottom cups 2 may have welded thereto an anchoring member 8, preferably in the form of an angle iron having one of its flanges perforated to receive a fastening. The unit A of the main supporting base preferably has offset from one end thereof the secondary supporting base consisting of the frame units A² and A³ which are essentially of the same construction as the units A and A¹ except that they are shorter and spaced closer together. To accomplish this end, the strips 6—6 constituting the frame C of the unit A project beyond their related damper B as indicated at 9 so as to be welded to a cross bar 10 which rigidly connects similarly extended end portions 9ª of the frames C¹ of the units A² and A³. The cross bar 10 is conveniently an angle bar which overlaps or overlies the upper edges of the strips constituting the frame C¹ while its lower flange abuts against the ends of the strips. Suitable welds are provided at the points of connection between the bar 19 and the ends of the strips constituting the frames C¹. It will, of course, be apparent from the drawing that the units A² and A³ include the dampers B¹ which are of the same design and construction as the dampers B.

It is also preferable to brace the frame C of the unit A of the main supporting base relative to the cross bar 10, and, to that end, a suitable diagonal brace 11 may be employed. By constructing the secondary supporting base, consisting of the primary units A² and A³, so that they are united by the bar 10, it will be apparent that the entire base may be shifted laterally, that is, to one side or the other of the ends 9 of the strips 6 of the primary frame unit A, before being welded thereto, in order to enable the secondary supporting base, which carries the fan, to be properly alined with the pulley on the motor. For example, in some cases, it is necessary to locate the motor and its supporting base behind or near a column while the fan must be positioned on another side of the column, and, by reason of the construction described, the secondary fan supporting base may be properly set relative to the main base so as to properly enable the motor to drive the fan when the complete assembly is erected.

From the foregoing, it will be apparent that the distinctive feature of the invention resides in providing a primary frame unit consisting of damper housings connected by strips or bars of metal which may be readily fabricated to the desired length, properly to space the dampers, and such units may be assembled in proper spaced relation to support the particular piece of machinery and also interconnected and braced so that the parts of the machine which are spaced from each other, but connected by a flexible driving element, such as a belt or chain, will always be in the proper relationship. In other words, the fan, for example, will always be held in fixed relation to one of the units constituting the main supporting frame for the motor. In this way, the main and secondary supporting bases will not shift relative to each other during the operation of the machine and all of the parts will be properly connected as well as efficiently isolated from the floor or sub-base.

I claim:

1. Vibration isolation means for a motor driven fan assembly, comprising a main supporting base and a secondary supporting base, said main supporting base consisting of a pair of primary frame units each including damper housings connected by spaced parallel strips, the strips of one of said units projecting beyond one of the dampers, said secondary supporting base also consisting of primary frame units each including damper housings connected by spaced parallel strips, the strips of each unit projecting beyond a damper of each unit, a cross bar connecting the projecting ends of the strips of the units of the secondary base, and the said projecting ends of the strips of one of the primary frame units of the main frame being connected with said cross bar, and a diagonal brace connecting one of the strips of the primary frames of the main supporting base with said cross bar.

2. Vibration isolation means for mounting a plurality of operatively related machines on a sub-base, comprising, a plurality of groups of vibration dampers resting on the sub-base for directly supporting the said machines thereon, the dampers of one group being alined in spaced parallel relation and the dampers of the other group being also alined in spaced parallel relation and in planes parallel with but disalined from the dampers of the first mentioned group, pairs of parallel frame elements connecting the alined dampers of each group, and means at the end of one pair of said parallel frame elements of one group for rigidly connecting a plurality of pairs of frame elements of the other group, said means including transverse and diagonal bracing elements.

SIEGFRIED ROSENZWEIG.